(12) United States Patent
Goto

(10) Patent No.: US 6,327,874 B1
(45) Date of Patent: *Dec. 11, 2001

(54) METHOD FOR MANUFACTURING A GLASS-CERAMIC SUBSTRATE FOR A MAGNETIC INFORMATION STORAGE MEDIUM

(75) Inventor: Naoyuki Goto, Sagamihara (JP)

(73) Assignee: Kabushiki Kaisha Ohara, Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/326,065

(22) Filed: Jun. 4, 1999

Related U.S. Application Data

(62) Division of application No. 08/755,981, filed on Nov. 25, 1996, which is a continuation of application No. 08/707,432, filed on Sep. 4, 1996, now abandoned.

(30) Foreign Application Priority Data

Oct. 31, 1995 (JP) ..................................... 7-306467
May 28, 1996 (JP) ..................................... 8-155972

(51) Int. Cl.$^7$ ................................................. C03B 32/02
(52) U.S. Cl. .............. 65/33.2; 65/33.8; 65/33.9; 204/157.41; 219/121.6; 219/121.61; 219/121.66; 219/121.69
(58) Field of Search .................................. 65/33.1, 33.2, 65/33.8, 33.9, 61; 204/157.41; 219/121.6, 121.61, 121.66, 121.69

(56) References Cited

U.S. PATENT DOCUMENTS

| | | | |
|---|---|---|---|
| 5,246,531 | * | 9/1993 | Junji et al. ............................. 216/47 |
| 5,391,522 | * | 2/1995 | Goto et al. ............................... 501/4 |
| 5,482,497 | * | 1/1996 | Gonnella et al. ....................... 451/57 |
| 5,534,321 | * | 7/1996 | Alpha et al. .......................... 428/64.2 |
| 5,567,484 | * | 10/1996 | Baumgart et al. .................... 427/555 |
| 5,595,791 | * | 1/1997 | Baumgart et al. .................... 427/554 |
| 5,768,076 | * | 6/1998 | Baumgart et al. .................... 360/135 |
| 5,822,211 | * | 10/1998 | Barenboim et al. ............. 364/474.08 |
| 5,875,084 | * | 2/1999 | Baumgart et al. .................... 360/135 |
| 5,910,262 | * | 6/1999 | Baumgart et al. .............. 219/121.77 |
| 6,086,977 | * | 7/2000 | Suzuki et al. ......................... 428/141 |

FOREIGN PATENT DOCUMENTS

| | | | |
|---|---|---|---|
| 652 554 A1 | * | 5/1995 | (EP) . |
| 6-290452 | * | 10/1994 | (JP) . |
| 6-329440 | * | 11/1994 | (JP) . |
| 7-65359 | * | 3/1995 | (JP) . |
| 7-157331 | | 6/1995 | (JP) . |
| 7-169048 | * | 7/1995 | (JP) . |
| 7-247138 | | 9/1995 | (JP) . |

* cited by examiner

Primary Examiner—Sean Vincent
(74) Attorney, Agent, or Firm—Hedman & Costigan, P.C.

(57) ABSTRACT

There is provided a glass-ceramic substrate for a magnetic information storage medium having a data zone and a landing zone capable of stably lifting a magnetic head in the landing zone and also capable of reducing the amount of lifting of the magnetic head in the data zone for realizing a high recording density. The landing zone has a multiplicity of projections or depressions formed by irradiation of laser beam. A $CO_2$ laser or a laser diode pumped solid-state laser can be used for this purpose. The surface roughness (Ra) of a polished surface of the landing zone is within a range from 3 Å to 9 Å, height of the projections or depressions is within a range from 50 Å to 300 Å, surface roughness (Ra) of the projections or depressions is within a range from 10 Å to 50 Å and interval of the projections or depressions is within a range from 10 $\mu m$ to 200 $\mu m$. A preferable glass-ceramic used is a glass-ceramic of a $SiO_2$—$Li_2O$—$K_2O$—$MgO$—$ZnO$—$P_2O_5$—$Al_2O_3$ system or a $SiO_2$—$Li_2O$—$K_2O$—$MgO$—$ZnO$—$P_2O_5$—$Al_2O_3$—$ZrO_2$ system. For stable forming of projections or depressions in the landing zone by a laser diode pumped solid-state laser, the glass-ceramic preferably includes at least two coloring agents selected from NiO, CoO, $MnO_2$, $V_2O_5$, CuO and $Cr_2O_3$.

11 Claims, 6 Drawing Sheets

15KV ×10,000 10μm WD10

15KV ×10,000 10μm WD10

METHOD FOR MANUFACTURING A GLASS-CERAMIC SUBSTRATE FOR A MAGNETIC INFORMATION STORAGE MEDIUM

This is a divisional of application Ser. No. 08/755,981, filed Nov. 25, 1996, which is a continuation of Ser. No. 08/707,432, filed Sep. 4, 1996 now abandoned.

BACKGROUND OF THE INVENTION

This invention relates to a substrate for a magnetic information storage medium used for an information storage device and, more particularly, to a substrate for a magnetic information storage medium such as a magnetic disk made of a glass-ceramic having an improved surface characteristic including a super flatness suited for a contact recording system and being capable of preventing sticking of a magnetic head to a magnetic information storage medium in a CSS (contact start and stop) type magnetic information storage medium, a magnetic information storage medium formed by subjecting the magnetic information storage medium substrate to a film-forming process and a method for manufacturing the magnetic information storage medium substrate. In this specification and claims, the term "magnetic information storage medium" means a magnetic information storage medium in the form of a disk such as a magnetic disk used as a hard disk in a personal computer and a magnetic information storage disk which can be used in a digital video camera.

There is an increasing tendency for utilizing a personal computer for multiple media purposes and a digital video camera and this tendency necessitates an information storage medium of a larger recording capacity. For this purpose, the bit number and track density of a magnetic information storage medium must be increased and the size of a bit cell must be reduced for increasing a surface recording density. As for a magnetic head, it must be operated in closer proximity to the surface of the magnetic information storage medium in conformity with the reduction of the bit cell. In a case where a magnetic head operates at an extremely low flying height or in a semi-contact state against a magnetic information storage medium, there occur sticking of a magnetic head to a surface of a magnetic information storage medium and accompanying head crash and damage to a magnetic film at the time of start and stop of the magnetic head.

For overcoming such problem, there is an increasing necessity for development of a new technique for start and stop of a magnetic head such as a landing zone system according to which a processing for preventing sticking of a magnetic head is made in a particular portion (i.e., a portion about the inner periphery where no recording or writing of data is made) of a magnetic information storage medium substrate and the magnetic head starts and stops in this particular portion. In the current CSS type information storage device, the magnetic head repeats an operation according to which the magnetic head is in contact with the magnetic disk before starting of operation of the device and is lifted from the magnetic disk when the operation of the device is started. If the surface of contact of the magnetic head with the magnetic disk is a mirror surface, sticking of the magnetic head to the magnetic disk occurs with the result that rotation of the magnetic disk is not started smoothly due to increase in friction and damage to the disk surface occurs. Thus, the magnetic disk is required to satisfy two conflicting demands of realizing lowering of the magnetic head and prevention of sticking of the magnetic head. For satisfying these two conflicting demands, development of the technique of the landing zone system is under way. Further, not only the current fixed type information storage devices, but also a removable information storage device such as a card hard disk drive is being developed for use in, e.g., a digital video camera. From the standpoint of such new technique, characteristics required for a substrate for a magnetic information storage medium substrate are as follows:

(1) In the CSS characteristics in the landing zone type magnetic information storage medium, sticking tends to occur between the head and the magnetic information storage medium due to increase in contact resistance caused by a high speed rotation of the magnetic information storage medium, if the magnetic information storage medium has a smooth surface with surface roughness (Ra) below 50 Å in a landing zone of the medium, i. e., an area in the medium where the magnetic head starts and stops its operation. On the other hand, if the magnetic information storage medium has a rough surface with surface roughness (Ra) above 300 Å in the landing zone, there is a danger of occurrence of crash of the magnetic head. It is necessary, therefore, to control the height of projections or depressions on the surface in the landing zone to 50 Å to 300 Å and also to control an interval of such projections or depressions in the landing zone to 10 µm to 200 µm and the surface roughness (Ra) in the landing zone to 10 Å to 50 Å.

(2) Since the amount of lifting of the head tends to decrease to the order of 0.025 µm or below owing to improvement in recording density of the magnetic information storage medium, a data zone on the surface of the magnetic information storage medium should have a surface roughness (Ra) of 3 Å–9 Å which enables the head to maintain this amount of lifting.

(3) By reason of an increased surface recording density, the magnetic information storage medium substrate should not have crystal anisotropy, a foreign matter or other defects and should have a dense, fine and homogeneous texture.

(4) The material of the magnetic information storage medium should have sufficient mechanical strength and hardness for standing a high speed rotation, contact with the head and use as a portable device such as a removable information storage device.

(5) As the surface recording density of a magnetic information storage medium is increased, an extremely fine and precise magnetic film such as a vertical magnetic film is required. For satisfying such requirement, the material of the magnetic information storage medium substrate must not contain $Na_2O$, $B_2O_3$, OH group and F ingredients in principle because these ingredients cause dispersion of ion of such ingredient during the film forming process with resulting production of coarse magnetic film particles and deterioration in the orientation of the magnetic film particles.

(6) The material of the magnetic information storage medium must have chemical durability against rinsing and etching with various chemicals.

Aluminum alloy has been conventionally used as a material of a magnetic disk substrate. The aluminum alloy substrate, however, tends to produce a substrate surface having projections or spot-like projections and depressions during the polishing process due to defects inherent in the material. As a result, the aluminum alloy substrate is not sufficient in flatness. Further, since an aluminum alloy is a soft material, deformation tends to take place so that it cannot cope with the recent requirement for making the magnetic disk thinner and the requirement for high density recording because the disk tends to be deformed by contact with the head with resulting damage to the recorded contents.

As a material for overcoming this problem of the aluminum alloy substrate, known in the art are glass substrates for magnetic disks made of a chemically tempered glass such as a sodium lime glass ($SiO_2$—CaO—$Na_2O$) and aluminosilicate glass ($SiO_2$—$Al_2O_3$—$Na_2O$). This glass substrate, however, has the following disadvantages:

(1) Polishing is made after chemical tempering and so the tempered layer tends to cause instability in thinning the disk substrate.

(2) For improving the CSS characteristics, the substrate must be subjected to mechanical or chemical processing called texturing. Since a mechanical processing or a thermal processing such as by laser beam cause a cracking or other defetcs due to distortion in the chemically tempered layer, texturing must be conducted by a chemical etching or a grain growth processing but this prevents mass production of the product at a competitive cost.

(3) Since the $Na_2O$ ingredient is included as an essential ingredient in the glass, the magnetic film characteristic of the glass is deteriorated with the result that the substrate cannot cope with the requirement for increasing the surface recording density.

Aside from the aluminum alloy substrate and chemically tempered glass substrate, known in the art are some substrate made of glass-ceramics. For example, Japanese Patent Application Laid-open No. 6-329440 discloses a glass-ceramic of a $SiO_2$—$Li_2O$—MgO—$P_2O_5$ system which includes lithium disilicate ($Li_2O$ $2SiO_2$) and alpha-quartz (alpha-$SiO_2$) as predominant crystal phases. This glass-ceramic is an excellent material in that, by controlling the grain size of globular grains of alpha-quartz, the conventional mechanical texturing or chemcial texturing becomes unnecessary and surface roughness (Ra) of a polished surface can be controlled within a range from 15 Å to 30 Å. This glass-ceramic cannot cope with the above described target surface roghness (Ra) of 3 Å to 9 Å and also cannot sufficiently cope with the above described tendency to lowering of the amount of lifting of a magnetic head necessitated by rapid increase in the recording capacity. Besides, in this glass-ceramic, no discussion about the landing zone to be described later in this specification is made at all.

Japanese Patent Application Laid-open No. 7-169048 discloses a photo-sensitive glass-ceramic of a $SiO_2$—$Li_2O$ system including Au and Ag as photo-sensitive metals characterized in that a data zone and a landing zone are formed on the surface of a magnetic disk substrate. A predominant crystal phase of this glass-ceramic is lithium silicate ($Li_2O.2SiO_2$) and/or lithium disilicate ($Li_2O.2SiO_2$). In case lithium silicate ($Li_2O.SiO_2$) is used, the glass-ceramic has a poor chemical durability so that it has a serious practical problem. Further, in forming of the landing zone, a part of the substrate (i.e., landing zone) is crystallized and is subjected to chemical etching by using 6% solution of HF. However, forming of the substrate with an uncrystallized part and a crystallized part makes the substrate instable mechanically as well chemically. As for chemical etching by HF solution, it is difficult to control concentration of the HF solution because of evaporation and other reasons so that this method is not suitable for a large scale production of products.

Several methods are known for forming a landing zone and a data zone on the surface of a magnetic disk substrate. For example, Japanese Patent Application Laid-open No. 6-290452 discloses a method for forming a landing zone on a carbon substrate by a pulsed laser having a wavelength of 523 nm. In this case, however, there are the following problems:

(1) A carbon substrate is formed by pressing at a high pressure and burning at a high temperature of about 2600° C. with resulting difficulty in a large scale production at a low cost.

(2) A carbon substrate has a high surface hardness and, therefore, processing of end portions and precision polishing of the surface are difficult with resulting difficulty in a large scale production at a low cost.

(3) The forming of the landing zone utilizes oxidization and evaporation of carbon by the pulse laser. Since carbon is a material which causes a very strong thermal oxidization reaction, the formed landing zone becomes instable and thus it poses a serious problem in reproduceability.

Japanese Patent Application Laid-open No. 7-65359 and United States Patent No. 5062021 disclose a method for forming a landing zone on an aluminum alloy by a pulsed laser. The aluminum alloy has the above described problems. Besides, the surface of the substrate after irradiation of laser beam tends to have a defect due to oxidization of a molten portion and remaining of splash of molten metal on the surface.

It is, therefore, an object of the present invention to provide a glass-ceramic substrate for a magnetic information storage medium which has eliminated the above described disadvantages of the prior art magnetic disk substrates and is capable of stably lifting a magnetic head in a landing zone where the magnetic head performs the CSS operation and is also capable of reducing the amount of lifting of the magnetic head in a data zone for realizing a high recording density of the data zone.

It is another object of the invention to provide a magnetic information storage medium formed by subjecting the magnetic information storage medium substrate to a film forming process.

It is another object of the invention to provide a method for manufacturing the glass-ceramic substrate for a magnetic information storage medium.

SUMMARY OF THE INVENTION

Accumulated studies and experiments made by the inventors of the present invention for achieving the above described objects of the invention have resulted in the finding, which has led to the present invention, that a glass-ceramic obtained by subjecting to heat treatment, within a specific temperature range, a base glass of a $SiO_2$—$Li_2O$—$K_2O$—MgO—ZnO—$P_2O_5$—$Al_2O_3$ system or a $SiO_2$—$Li_2O$—$K_2O$—MgO—ZnO—$P_2O_5$—$Al_2O_3$—$ZrO_2$ system or a glass of either of these systems further containing at least two of NiO, CoO, $MnO_2$, $V_2O_5$, CuO and $Cr_2O_3$ as a coloring agent has a crystal phase of either lithium disilicate ($Li_2O.$ $2SiO_2$), a mixed crystal of lithium disilicate ($Li_2O.2SiO_2$) and alpha-quartz (alpha-$SiO_2$) or a mixed crystal of lithium disilicate ($Li_2O.2SiO_2$) and alpha-cristobalite (alpha-$SiO_2$) with fine globular crystal grains, has an excellent flatness after polishing and is extremely advantageous for forming of a landing zone and a data zone on the surface of the magnetic information storage medium substrate because it has an excellent processability when it is subjected to processing by a laser (a $CO_2$ laser or a laser diode pumped solid-state laser).

For achieving the object of the invention, there is provided a glass-ceramic substrate for a magnetic information storage medium having a data zone and a landing zone, said landing zone having a multiplicity of projections or depressions formed by irradiation of laser beam.

According to the invention, a laser used is a $CO_2$ laser or a laser diode pumped solid-state laser.

According to the invention, said laser diode pumped solid-state laser is an Nd-YAG laser, an Nd-YVO$_4$ laser or an Nd-YLF laser.

In one aspect of the invention, a wavelength of said laser diode pumped solid-state laser is within a range of 0.2 μm–0.6 μm or within a range of 1.05 μm–1.40 μm.

In another aspect of the invention, surface roughness (Ra) of a polished surface of the landing zone is within a range from 3 Å to 9 Å and height of the projections or depressions formed by the laser beam in the landing zone is within a range from 50 Å to 300 Å and surface roughness (Ra) of the projections and depressions is within a range from 10 Å to 50 Å.

In another aspect of the invention, interval of the projections or depressions is within a range from 10 μm to 200 μm.

In another aspect of the invention, a glass-ceramic used is a glass-ceramic of a $SiO_2$—$Li_2O$—$K_2O$—$MgO$—$ZnO$—$P_2O_5$—$Al_2O_3$ system or of a $SiO_2$—$Li_2O$—$K_2O$—$MgO$—$ZnO$—$P_2O_5$—$Al_2O_3$—$ZrO_2$ system.

In another aspect of the invention, a glass-ceramic substrate for a magnetic information storage medium is formed by subjecting to heat treatment a base glass which consists in weight percent of:

| | |
|---|---|
| $SiO_2$ | 70–80% |
| $Li_2O$ | 9–12% |
| $K_2O$ | 2–5% |
| MgO + ZnO | 1.2–5% |
| in which MgO | 0.5–5% |
| ZnO | 0.2–3% |
| $P_2O_5$ | 1.5–3% |
| $Al_2O_3$ | 2–5% |
| $Sb_2O_3$ | 0–1% |
| $As_2O_3$ | 0–1% | a main crystal phase of said glass-ceramic being at least one of lithium disilicate ($Li_2O.2SiO_2$), a mixed crystal of lithium disilicate and alpha-quartz (alpha-$SiO_2$) and a mixed crystal of lithium disilicate and alpha-cristobalite (alpha-$SiO_2$), and said laser being a $CO_2$ laser.

In another aspect of the invention, a glass-ceramic substrate includes, in addition to the above described ingredients, 0.5–5% of $ZrO_2$.

In another aspect of the invention, a glass-ceramic substrate for a magnetic information storage medium includes at least two ingredients of NiO, CoO, $MnO_2$, $V_2O_5$, CuO, $Cr_2O_3$ as a coloring agent.

In another aspect of the invention, a glass-ceramic substrate for a magnetic information storage medium is formed by subjecting to heat treatment a base glass which consists in weight percent of:

| | |
|---|---|
| $SiO_2$ | 70–80% |
| $Li_2O$ | 9–12% |
| $K_2O$ | 2–5% |
| MgO + ZnO | 1.2–5% |

-continued

| | |
|---|---|
| in which MgO | 0.5–5% |
| ZnO | 0.2–3% |
| $P_2O_5$ | 1.5–3% |
| $Al_2O_3$ | 2–5% |
| $Sb_2O_3$ | 0–1% |
| $As_2O_3$ | 0–1% |
| $V_2O_5$ + CuO + $Cr_2O_3$ + $MnO_2$ + CoO + NiO | 0.08–2.5% |
| in which $V_2O_5$ | 0.02–0.8% |
| CuO | 0.02–0.8% |
| $Cr_2O_3$ | 0–0.8% |
| $MnO_2$ | 0.02–0.8% |
| CoO | 0–0.8% |
| NiO | 0–0.8% | a main crystal phase of said glass-ceramic being at least one of lithium disilicate ($Li_2O.2SiO_2$), a mixed crystal of lithium disilicate and alpha-quartz (alpha-$SiO_2$) and a mixed crystal of lithium disilicate and alpha-critobalite (alpha-$SiO_2$), and said laser being a laser diode pumped solid-state laser.

In another aspect of the invention, a glass-ceramic substrate includes, in addition to the above described ingredients, 0.5–5% of $ZrO_2$.

In another aspect of the invention, in the glass-ceramic substrate, percent transmission by a laser diode pumped solid-state laser of a wavelength of 1.06 μm at a thickness of 0.635 mm is 80% to 40%.

In another aspect of the invention, a cristal phase of the glass-ceramic is a lithium disilicate ($Li_2O\ 2SiO_2$) or a mixed crystal of lithium disilicate and alpha-quartz (alpha-$SiO_2$), crystal grains of lithium disilicate have a globular grain structure and have a diameter within a range from 0.1 μm to 0.5 μm, and crystal grains of alpha-quartz have a globular grain structure made of aggregated particles and have a diameter within a range from 0.3 μm to 1.0 μm.

In another aspect of the invention, a cristal phase of the glass-ceramic is a lithium disilicate ($Li_2O.2SiO_2$) or a mixed crystal of lithium disilicate and alpha-cristobalite (alpha-$SiO_2$), crystal grains of lithium disilicate have a globular grain structure and have a diameter within a range from 0.1 μm to 0.5 μm, and crystal grains of alpha-cristobalite have a globular grain structure made of aggregated particles and have a diameter within a range from 0.2 μm to 1.0 μm.

In another aspect of the invention, a glass-ceramic substrate for a magnetic information storage medium is formed by subjecting to heat treatment a base glass which consists in weight percent of:

| | |
|---|---|
| $SiO_2$ | 70–80% |
| $Li_2O$ | 9–12% |
| $K_2O$ | 2–5% |
| MgO + ZnO | 1.2–5% |
| in which MgO | 0.5–5% |
| ZnO | 0.2–3% |
| $P_2O_5$ | 1.5–3% |
| $ZrO_2$ | 0.5–5% |
| $Al_2O_3$ | 2–5% |
| $Sb_2O_3$ | 0–1% |
| $As_2O_3$ | 0–1% |
| NiO | 0.5–3% |
| CoO | 0.5–3% |
| $MnO_2$ | 0–0.5% |
| $V_2O_5$ | 0–0.5% |
| CuO | 0–1% |
| $Cr_2O_3$ | 0–1.5% | a main crystal phase of said glass-ceramic being at least one of lithium disilicate ($Li_2O.2SiO_2$), a mixed crystal of lithium disilicate and alpha-quartz (alpha-$SiO_2$) and a mixed crystal of lithium disilicate and alpha-critobalite (alpha-$SiO_2$), and said laser being a laser diode pumped solid-state laser.

In another aspect of the invention, in the glass-ceramic, percent transmission by a laser diode pumped solid-state laser of a wavelength of 0.2 μm–0.6 μm or 1.05 μm–1.40 μm at a thickness of 0.635 mm is 0% to 40%.

In another aspect of the invention, a cristal phase of the glass-ceramic is a lithium disilicate ($Li_2O.2SiO_2$) or a mixed crystal of lithium disilicate and alpha-quartz (alpha-$SiO_2$) or a mixed crystal of lithium disilicate and alpha-cristobalite (alpah-$SiO_2$), crystal grains of lithium disilicate have a globular grain structure and have a diameter within a range from 0.05 μm to 0.3 μm, crystal grains of alpha-cristobalite have a globular grain structure and have a diameter within a range from 0.10 μm to 0.50 μm and crystal grains of alpha-quartz have a globular grain structure made of aggregated particles and have a diameter within a range from 0.10 μm to 1.00 μm.

In another aspect of the invention, there is provided a method for manufacturing a glass-ceramic substrate for a magnetic information storage medium having a data zone and a landing zone comprising steps of:

melting a base glass which consists in weight percent of:

| | |
|---|---|
| $SiO_2$ | 70–80% |
| $Li_2O$ | 9–12% |
| $K_2O$ | 2–5% |
| MgO + ZnO | 1.2–5% |
| in which MgO | 0.5–5% |
| ZnO | 0.2–3% |
| $P_2O_5$ | 1.5–3% |
| $Al_2O_3$ | 2–5% |
| $Sb_2O_3$ | 0–1% |
| $As_2O_3$ | 0–1% | forming the molten glass into a desired shape;
subjecting the formed glass to heat treatment for producing a crystal nucleus under a temperature within a range from 450° C. to 550° C. for one to twelve hours; further subjecting the glass to heat treatment for crystallization under a temperature within a range from 680° C. to 750° C. for one to twelve hours;
polishing the surface of the glass to a surface roughness (Ra) within a range from 3 Å to 9 Å; and
forming in the landing zone a multiplicity of projections or depressions by irradiation of laser beam by a $CO_2$ laser, said projections or depressions having a height within a range of 50 Å to 300 Å and a surface roughness (Ra) within a range from 10 Å to 50 Å.

In another aspect of the invention, the method for manufacturing a glass-ceramic uses a base glass which includes 0.5–5% of $ZrO_2$ in addition to the above described ingredients and uses a crystallizing temperature within a range from 680° C. to 780 C.

In another aspect of the invention, a method for manufacturing a substrate for a magnetic information storage medium having a data zone and a landing zone comprises steps of:

melting a base glass which consists in weight percent of:

| | |
|---|---|
| $SiO_2$ | 70–80% |
| $Li_2O$ | 9–12% |
| $K_2O$ | 2–5% |
| MgO + ZnO | 1.2–5% |
| in which MgO | 0.5–5% |
| ZnO | 0.2–3% |
| $P_2O_5$ | 1.5–3% |
| $Al_2O_3$ | 2–5% |
| $Sb_2O_3$ | 0–1% |
| $As_2O_3$ | 0–1% |
| $V_2O_5$ + CuO + $Cr_2O_3$ + $MnO_2$ + CoO + NiO | 0.08–2.5% |
| in which $V_2O_5$ | 0.02–0.8% |
| CuO | 0.02–0.8% |
| $Cr_2O_3$ | 0–0.8% |
| $MnO_2$ | 0.02–0.8% |
| CoO | 0–0.8% |
| NiO | 0–0.8% | forming the molten glass into a desired shape;
subjecting the formed glass to heat treatment for producing a crystal nucleus under a temperature within a range from 450° C. to 550° C. for one to twelve hours;
further subjecting the glass to heat treatment for crystallization under a temperature within a range from 680° C. to 750° C. for one to twelve hours;
polishing the surface of the glass to a surface roughness (Ra) within a range from 3 Å to 9 Å; and
forming in the landing zone a multiplicity of projections or depressions by irradiation of laser beam by a laser diode pumpled solid-state laser, said projections or depressions having a height within a range of 50 Å to 300 Å and a surface roughness (Ra) within a range from 10 Å to 50 Å.

In another aspect of the invention, the method for manufacturing a glass-ceramic substrate uses a base glass which includes 0.5–5% of $ZrO_2$ in addition to the above described ingredients and uses a crystallizing temperature within a range from 680° C. to 780° C.

In another aspect of the invention, there is provided a method for manufacturing a glass-ceramic substrate for a magnetic information storage medium having a data zone and a landing zone comprising steps of:

melting a base glass which consists in weight percent of:

| | |
|---|---|
| $SiO_2$ | 70–80% |
| $Li_2O$ | 9–12% |
| $K_2O$ | 2–5% |
| MgO + ZnO | 1.2–5% |
| in which MgO | 0.5–5% |
| ZnO | 0.2–3% |
| $P_2O_5$ | 1.5–3% |
| $ZrO_2$ | 0.5–5% |
| $Al_2O_3$ | 2–5% |
| $Sb_2O_3$ | 0–1% |
| $As_2O_3$ | 0–1% |
| NiO | 0.5–3% |
| CoO | 0.5–3% |
| $MnO_2$ | 0–0.5% |
| $V_2O_5$ | 0–0.5% |
| CuO | 0–1% |
| $Cr_2O_3$ | 0–1.5% | forming the molten glass into a desired shape;
subjecting the formed glass to heat treatment for producing a crystal nucleus under a temperature within a range from 450° C. to 550° C. for one to twelve hours;
further subjecting the glass to heat treatment for crystallization under a temperature within a range from 680° C. to 750° C. for one to twelve hours;

polishing the surface of the glass to a surface roughness (Ra) within a range from 3 Å to 9 Å; and forming in the landing zone a multiplicity of projections or depressions by irradiation of laser beam by a laser diode pumpled solid-state laser, said projections or depressions having a height within a range of 50 Å to 300 Å and a surface roughness (Ra) within a range from 10 Å to 50 Å.

In still another aspect of the invention, there is provided a magnetic information storage medium having a film of a magnetic media formed on said glass-ceramic substrate.

DETAILED DESCRIPTION OF THE INVENTION

The composition of the glass-ceramic substrate of the invention is expressed on the basis of composition of oxides as in its base glass. The above described content ranges of the respective ingredients have been selected for the reasons stated below.

The $SiO_2$ ingredient is an important ingredient which produces lithium disilicate ($Li_2O.2SiO_2$), alpha-quartz (alpha-$SiO_2$) and/or alpha-cristobalite (alpha-$SiO_2$) crystal as a predominant crystal phase when the base glass is subjected to heat treatment. If the amount of this ingredient is below 70%, the crystal produced in the glass-ceramic is instable and its texture tends to become too rough. If the amount of this ingredient exceeds 80%, difficulty arises in melting and forming the base glass.

The $Li_2O$ ingredient is also an important ingredient which produces lithium disilicate ($Li_2O.2SiO_2$) cystal as a predominant crystal phase by heat treating the base glass. If the amount of this ingredient is below 9%, growth of this crystal becomes difficult and melting of the base glass becomes also difficult. If the amount of this ingredient exceeds 12%, the grown crystal of the glass-ceramic becomes instable and its texture tends to become too rough and, besides, chemical durability and hardness of the glass-ceramic are deteriorated.

The $K_2O$ ingredient improves melting property of the base glass and prevents crystal grains from becoming too rough. If the amount of this ingredient is below 2%, the above effects cannot be obtained whereas, if the amount of this ingredient exceeds 5%, the grown crystal becomes too rough, there occurs change in the crystal phase and chemical durability is deteriorated.

The MgO and ZnO ingredients are important ingredients which have been found in the present invention to cause a globular crsytal grain of lithium disilicate ($Li_2O.2SiO_2$), alpha-quartz (alpha-$SiO_2$) and alpha-cristobalite (alpha-$SiO_2$) as a predominant crystal phase. If the amount of MgO is below 0.5%, that of ZnO is below 0.2%. and the total amount of MgO and ZnO is below 1.2%, these effects cannot be obtained whereas, if the amount of MgO exceeds 5%, that of ZnO exceeds 3% and the total amount of MgO and ZnO exceeds 5%, the desired crystals cannot grow.

The $P_2O_5$ ingredient is an essential ingredient as a nucleating agent for the glass-ceramic. If the amount of this ingredient is below 1.5%, sufficient forming of a nucleus cannot be attained and a resulting crystal will become too rough whereas, if the amount of this ingredient exceeds 3%, devitrification occurs with resulting difficulty in mass production.

The $Al_2O_3$ ingredient improves chemical durability and hardness of the glass-ceramic. If the amount of this ingredient is below 2%, these effects cannot be obtained whereas, if the amount of this ingredient exceeds 5%, melting property is deteriorated and devitrification occurs and the grown crystal changes to beta-spodumene ($Li_2O.2SiO_2$).

In a case where the glass-ceramic substrate of the present invention is made of a $SiO_2$—$Li_2O$—$K_2O$—MgO—ZnO—$P_2O_5$—$Al_2O_3$—$ZrO_2$ system, the $ZrO_2$ ingredient is a very important ingredient which has been found in the present invention to function as a nucleating agent in the same manner as the $P_2O_5$ ingredient and moreover significantly contribute to growth of fine crystal grains and improve the mechanical strength and chemcial durability of the glass-ceramic. If the amount of this ingredient is below 0.5%, these advantageous results cannot be attained whereas, if the amount of this ingredient exceeds 5%, difficulty arises in melting of the base glass and an unmelted portion such as $ZrSiO_4$ is produced.

The $As_2O_3$ and/or $Sb_2O_3$ ingredients may be added as refining agents in melting of the base glass. It will suffice if each ingredient up to 1% is added.

In a case where forming of projections or depressions in the landing zone is made by irradiation of laser beam by a laser diode pumped solid-state laser, addition of a coloring agent has been found to be indispensable for attaining a sufficient absorption of laser beam. In a case where forming of projections or depressions is made by a $CO_2$ laser, addition of a coloring agent is unnecessary but it is possible to irradiate a $CO_2$ laser beam on a system including a coloring agent.

In the present invention, at least two different coloring agents must be used from among NiO, CoO, $MnO_2$, $V_2O_5$, CuO and $Cr_2O_3$. The glass-ceramic of the invention which includes a coloring agent can be classified into a $V_2O_5$—CuO—$MnO_2$ system and a NiO—CoO system depending upon the coloring agents used as essential ingredients.

In the coloring agent system of $V_2O_5$—CuO—$MnO_2$, the $V_2O_5$, CuO and $MnO_2$ ingredients are essential ingredients as the coloring agents for improving the laser absorption effect without adversely affecting the crystal microstructure of the glass when laser beam is irradiated by a laser diode pumped solid-state laser for forming of projections and depressions in the landing zone. If the amount the respective coloring agents is below 0.02%, this advantageous result cannot be obtained whereas, if the amount of the respective coloring agents exceeds 0.8%, crystals grown tend to become too rough. The total amount of $V_2O_5$+CuO+$MnO_2$ should preferably be within a range from 0.08% to 2.5%. In the laser processing by a laser diode pumped solid-state laser, percent transmission available at the laser wavelength (1.06 $\mu$m) of the $V_2O_5$—CuO—$MnO_2$ system colored glass-ceramic is 80% to 40% at a plate thickness of 0.635 mm. In this coloring agent system, $Cr_2O_3$, CoO and/or NiO ingredients may be optionally added because these ingredients have an effect similar to the $V_2O_5$, CuO and $MnO_2$ ingredients. If the amount of each of these optional coloring agents exceeds 0.8%, grown crystal grains tend to become too rough.

It has been found that a particularly preferable percent transmission for sufficiently heating the glass-ceramic by a laser diode pumped solid-state laser without excessively increasing the laser output at the laser wavelength used for this purpose (i.e., 0.2 $\mu$m–0.6 $\mu$m or 1.05 $\mu$m–1.40 $\mu$m) is 0% to 40% at a plate thickness of 0.635 mm. By determining the percent transmission at a value within this range, laser irradiation time can be held to the minimum and therefore an excessive stress is not produced in the surface portion of the substrate whereby forming of projections or depressions can be achieved in a stable manner while ensuring a large scale production of the substrate.

This preferable percent transmission of 0% to 40% can be realized by using the NiO—CoO system as the coloring agents.

In the NiO—CoO system, the NiO, CoO, $V_2O_5$, $MnO_2$, CuO and $Cr_2O_3$ ingredients are used as coloring agents for improving the laser absorption effect without adversely affecting the microstructure of the crystal phase of the glass in forming of projections or depressions in the landing zone by a laser diode pumped solid-state laser. The NiO and CoO ingredients, particularly the CoO ingredient, are important ingredients which absorb laser light at the wavelength of 0.2 $\mu$m–0.6 $\mu$m and 1.05 $\mu$m–1.40 $\mu$m and thereby reduces the percent transmission of the glass-ceramic substrate. it has, however, been found that there is limitation in absorption by the CoO ingredient alone in any of these wavelength ranges with the result that the percent transmission cannot be sufficiently reduced and that, by coexistence of the NiO ingredient with the CoO ingredient, the percent transmission is reduced significantly in all of the wavelength ranges and the percent transmission of 0%–40% can thereby be achieved. Therefore, both the NiO and CoO ingredients are indispensable ingredients for achieving the desired range of percent transmission. If the amount of the respective ingredients is below 0.5%, the desired effect cannot be attained whereas if the amount of the respective ingredients exceeds 3%, the grown crystal grains tend to become too rough.

The $MnO_2$, $V_2O_5$, CuO and $Cr_2O_3$ ingredients may also be added because they are also effective for complementing reduction of the percent transmission by the NiO and CoO ingredients. If the amount of the $Mno_2$ ingredient exceeds 0.5%, that of the CuO ingredient 1% and that of the $Cr_2O_3$ ingredient 1.5% respectively, grown crystal grains tend to become too rough and percent transmission is adversely affected. If the amount of the $V_{2I\,o5}$ ingredient exceeds 1.5%, grown crystal grains tend to become too rough and coloring of the glass-ceramic is adversely afftected by the reduction effect peculiar to $V_2O_5$ in the heat treatment for crystallization.

For manufacturing the glass-ceramic substrate for a magnetic information storage medium, the base glass having the above described composition is subjected to heat forming and/or cold forming, is heat treated for producing a crystal nucleus under a temperature within a range from 450° C. to 550° C. for about one to twelve hours and is further heat treated for crystallization under a temperature within a range from 680° C. to 780° C. for about one to twelve hours.

The glass-ceramic which has been crystallized under the above described conditions is either lithium disilicate ($Li_2O.2SiO_2$), a mixed crystal of lithium disilicate and alpha-quartz (alpha-$SiO_2$) or a mixed crystal of lithium disilicate and alpha-cristobalite (alpha-$SiO_2$). The crystal grains of lithium disilicate have a globular grain structure and have a diameter within a range from 0.1 $\mu$m to 0.5 $\mu$m in the system which has no coloring agent or has the coloring agent system of $V_2O_5$—CuO—$MnO_2$ and a dimater within a range from 0.05 $\mu$m–0.30 $\mu$m in the system which has the coloring agent system of NiO—CoO. The crystal grains of alpha-quartz have a globular grain structure made of aggregated particles and have a diameter within a range from 0.30 $\mu$m to 1.0 $\mu$m. The crystal grains of alpha-cristobalite have a globular grain structure and have a diameter within a range from 0.20 Pm to 1.0 pm in the system which has no coloring agnet or has the coloring agent system of $V_2O_5$—CuO—$MnO_2$ and a diamter within a range from 0.10 $\mu$m to 0.50 $\mu$m in the system which has the coloring agent system of NiO—CoO.

Owing to the specific composition and the specific crystal phase and grain diamter described above, the glass-ceramic substrate according to the invention has the melting point within a range from 950° C. to 1150° C. and other conditions which are most suited to stable forming of projections or depressions by irradiation of laser beam as described later.

The glass-ceramic obtained by the above described heat treatment is subjected to conventional lapping and polishing processes and thereupon a glass-ceramic substrate for a magnetic information storage medium having a surface roughness (Ra) within a range from 3 Å to 9 Å is provided.

The glass-ceramic substrate is then subjected to the process of forming of projections or depressions in the landing zone by a $CO_2$ laser or a laser diode pumped solid-state laser.

The laser wavelength of the laser diode pumped solid-state laser used in forming projections or depressions in the landing zone is limited to either 0.3 $\mu$m–0.6 $\mu$m or 1.05 $\mu$m–1.40 $\mu$m. By irradiation of laser beam of this wavelength, projections or depressions having height within a range from 50 Å to 300 Å and a surface roughness (Ra) within a range from 10 Å to 50 Å are formed in the landing zone at an interval within a range from 10 $\mu$m to 200 $\mu$m. Thus, a glass-ceramic substrate for a magnetic disk as shown in FIG. 1 which has a landing zone formed with projections or depressions having height within a range from 50 Å to 300 Å and a data zone which has an excellent smooth surface can be provided. In FIG. 1, a glass-ceramic substrate 1 has a landing zone 3 provided outside of a central opening 5 and a data zone 2 provided outside of the landing zone 3. Reference character 4 designates a portion called "ring" formed inside of the landing zone 3. FIG. 2 shows a shape of projections or depressions formed in the landing zone. FIG. 3 shows a shape of projections formed in the landing zone. FIG. 4 shows interval of projections or depressions formed in the landing zone. FIG. 5 shows height of projections or depressions formed in the landing zone.

Lasers generally used for surface change such as cutting, welding and microprocessing of a material are classified to an Ar laser, a $CO_2$ laser, an excimer laser and a laser diode pumped solid-state laser. It has been found that, in the laser processing for the glass-ceramic of the invention, suitable lasers are limited to the laser diode pumped solid-state laser and $CO_2$ laser because the Ar laser and excimer laser produce an unsuitable shape of projections or depressions and also cause a surface defect due to splashing of molten material.

For forming projections or depressions in the landing zone by the laser diode pumped solid-state laser or the $CO_2$ laser, a polished glass-ceramic substrate is rotated in a state clamped by a spindle and pulsed laser beam is irradiated vertically on the surface of the landing zone at a predetermined interval.

In irradiating the pulsed laser, a spot diameter within a range from 2 $\mu$m to 50 $\mu$m is used in the case of the laser diode pumped solid-state laser and a spot diamter within a range from 15 $\mu$m to 50 $\mu$m is used in the case of the $CO_2$ laser. Laser irradiation conditions such as laser output and pulse width are controlled in accordance with the composition of the glass-ceramic under processing.

Principal conditions which affect forming of projections or depressions on the substrate surface by irradiation of laser beam are (1) laser output, (2) length of laser pulse and (3) laser spot diameter, i.e., the area of irradiation on the substrate surface. As for material of the substrate, melting point of the glass and that of the grown crystal affect forming of projections or depressions. Particularly, as for the material of the substrate for which the laser diode pumped solid-state laser is used, the absorption characteristics at the laser wavelength used (0.2 μm–0.6 μm or 1.05 μm–1.40 μm), that is, low percent transmission at the laser wavelength used, is the most important factor and other factors which affect forming of projections or depressions are melting points of the glass and grown crystal by laser irradiation (heat-up). For example, a substrate made of an ordinary glass in which no crystal is grown does not selectively absorb the used wavelength of a laser diode pumped solid-state laser and therefore the surface of the substrate is not heated up with the result that no projections or depressions can be formed. Even if this ordinary glass is improved to a glass which can absorb the used wavelength of the laser diode pumped solid-state laser, the melting point of this glass is lower than the melting point of a glass-ceramic as shown in the following Table 1 and, as a result, a melted portion of the glass becomes instable when it is subjected to irradiation of laser beam so that it is difficult to control forming of projections or depressions. Besides, a microcrack which is produced by thermal strain between a portion which is irradiated with laser beam and a portion which is not irradiated significantly reduces strength of the substrate. In the case of a glass-ceramic substrate, the type of a crystal grown significantly affects the melting point of the glass-ceramic. The glass-ceramic substrate according to the invention has a higher melting point than the substrate made of a glass and hence projections or depressions can be formed in a stable manner by irradiation of laser beam. In contrast, conventional glass-ceramics such as those of $MgO$—$Al_2O_3$—$SiO_2$, $ZnO$—$Al_2O_3$—$SiO_2$ and $Li_2O$—$Al_2O_3$—$SiO_2$ systems do not selectively absorb the used wavelength of the laser diode pumped solid-state laser and therefore it is not possible to heat up the substrate surface thereby to form projections and depressions. Even if these conventional glass-ceramics are changed to materials which absorb the used laser wavelength, it will be necessary to perform the laser processing with a high output since the melting points of these materials are higher than the glass-ceramic of the present invention as shown in the following Table 1. As a result, in these glass-ceramics, microcracks due to strain will be generated and forming of projections or depressions of a desired shape will become extremely difficult.

TABLE 1

|  | Melting point |
| --- | --- |
| $Al_2O_3$-$SiO_2$ glass | 800° C.–900° C. |
| $MgO$-$Al_2O_3$-$SiO_2$ glass ceramic | 1300° C.–1400° C. |
| $ZnO$-$Al_2O_3$-$SiO_2$ glass-ceramic | 1250° C.–1350° C. |
| $Li_2O$-$Al_2O_3$-$SiO_2$ glass-ceramic | 1300° C.–1400° C. |
| Glass-ceramic of the present invention | 950° C.–1150° C. |

The glass-ceramic substrate formed with projections or depressions in the landing zone by the laser processing is then subjected to a film forming process which is known per se and thereby is formed into a high recording density magnetic information storage medium. More specifically, the glass-ceramic substrate is heated in vacuum and then is coated, by a sputtering process, with an intermediate layer of cromium, a magnetic layer of cobalt alloy and a protective layer of carbon and then is coated again with a lubricating material layer on the surface of the protective layer to provide a magnetic information storage medium.

Examples of the present invention will be described below with reference to the accompanying drawings.

EXAMPLES

Figure 1:
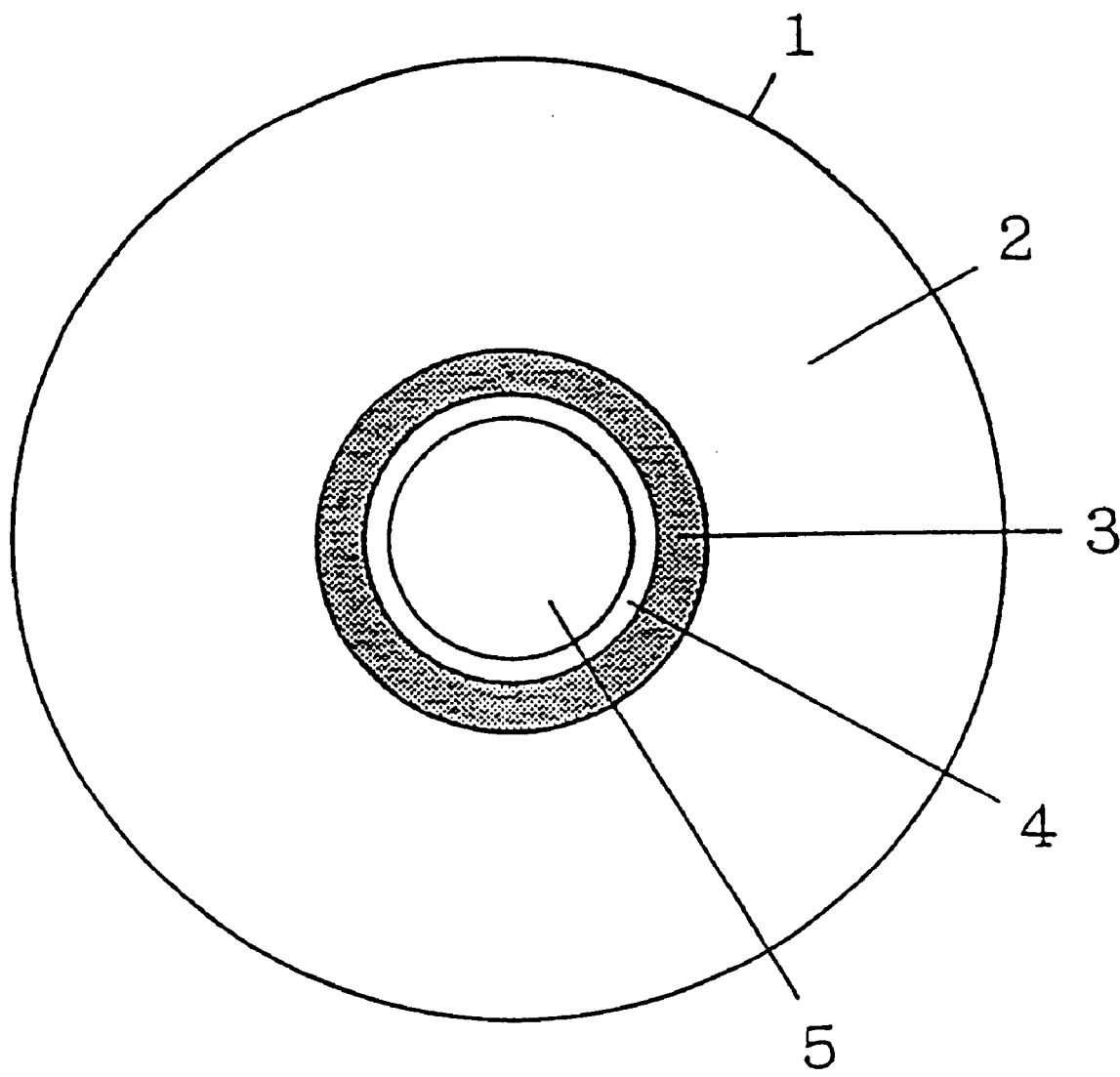
FIG. 1 is a top plan view of the state of a landing zone and a data zone formed outside of a central opening of a glass-ceramic substrate for a mangetic information storage medium according to the invention.
Figure 2:
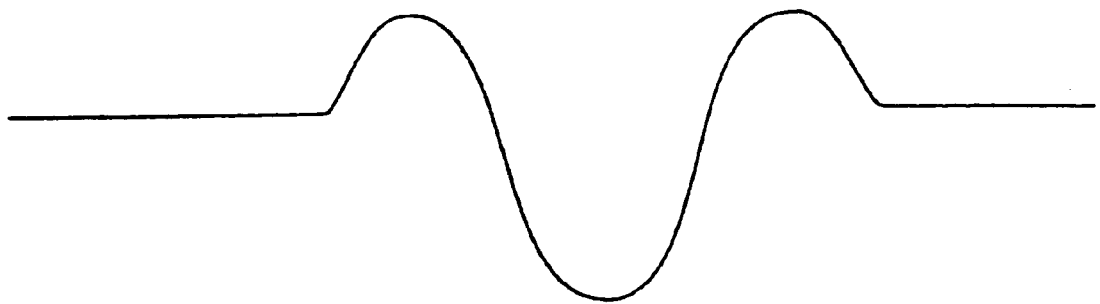
FIG. 2 is a sectional view showing the shape of projections and depressions formed in the landing zone.
Figure 3:
FIG. 3 is a sectional view showing the shape of projections formed in the landing zone.
Figure 4:
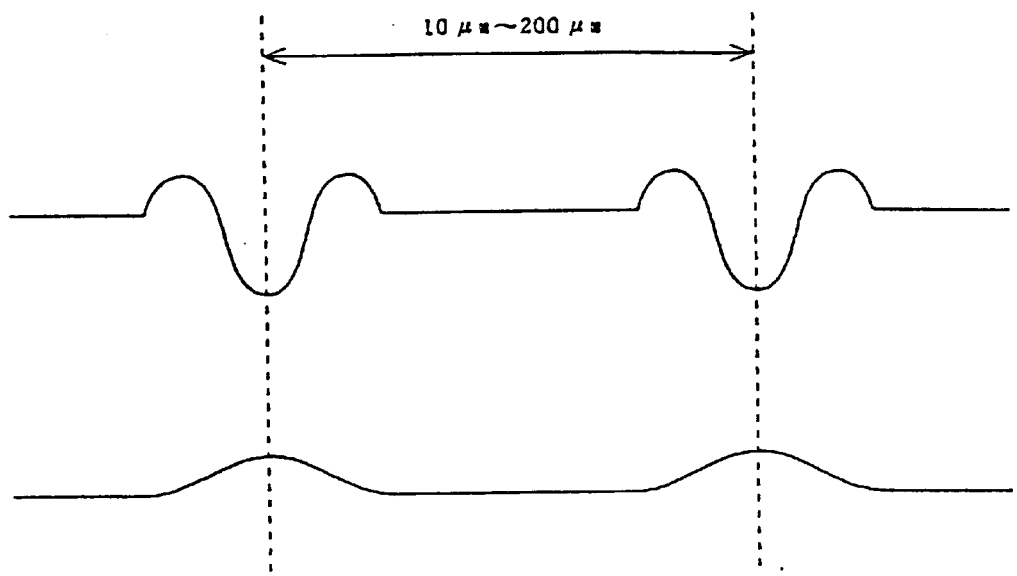
FIG. 4 is a sectional view showing the interval of projections and depressions formed in the landing zone.
Figure 5:
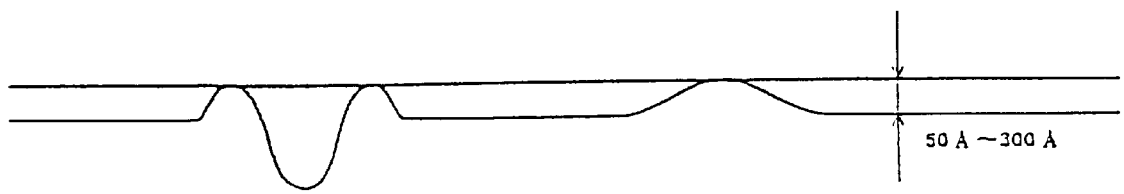
FIG. 5 is a sectional view showing the height of projections and depressions formed in the landing zone.

Preferred examples of the glass-ceramic substrate according to the invention will now be described. Tables 2 to 4 show examples (No. I to No. 7) of composition relating to the system which includes no coloring agent and the system which includes the $V_2O_5$—$CuO$—$MnO_2$ coloring agent system together with the temperature of nucleation, temperature of crystallization, predominant crystal phase, grain diameter of crystal grains, color appearance of the glass-ceramic, percent transmission of laser wavelength 1.06 μm of Nd-YAG laser at a plate thickness of 0.635 mm and percent transmission of laser wavelength 10.5 μm, type of laser used, surface roughness (Ra), Ra of the landing zone after laser processing, Ra of the data zone after laser processing, Ra of the data zone after polishing and height of projections or depressions. In the subsequent tables, the amounts of the respective ingredients are expressed in weight percent.

TABLE 2

| (weight %) | Examples No. | | |
| --- | --- | --- | --- |
|  | 1 | 2 | 3 |
| $SiO_2$ | 79.0 | 75.8 | 77.0 |
| $Li_2O$ | 10.5 | 10.0 | 10.0 |
| $P_2O_5$ | 2.0 | 2.5 | 2.5 |
| $ZrO_2$ |  | 1.5 |  |

TABLE 2-continued (weight %)

| | Examples No. | | |
|---|---|---|---|
| | 1 | 2 | 3 |
| $Al_2O_3$ | 3.5 | 2.5 | 3.0 |
| MgO | 1.2 | 2.3 | 2.5 |
| ZnO | 0.7 | 0.5 | 0.8 |
| $K_2O$ | 2.8 | 3.5 | 4.0 |
| $V_2O_5$ | | 0.4 | |
| $MnO_2$ | | 0.4 | |
| CuO | | 0.4 | |
| $Cr_2O_3$ | | | |
| CoO | | | |
| $Sb_2O_3$ | | 0.2 | |
| $As_2O_3$ | 0.3 | | 0.2 |
| nucleation temperature (° C.) | 520 | 540 | 480 |
| crystallization temperature (° C.) | 730 | 720 | 710 |
| color | white | green | white |
| crystal phase and diameter | $Li_2Si_2O_5$ 0.1 μm α-cristobalite 0.2 μm | $Li_2Si_2O_5$ 0.1 μm α-quartz 0.1 μm | $Li_2Si_2O_5$ 0.1 μm |
| crystal grain shape | $Li_2Si_2O_5$ globular α-cristobalite globular | $Li_2Si_2O_5$ globular α-cristobalite globular | $Li_2Si_2O_5$ globular |
| percent transmission | | | |
| 1.06 μm T % | 88% | 62% | 89% |
| 10.5 μm T % | 0% | 0% | 0% |
| type of pulsed laser | $CO_2$ | YAG | $CO_2$ |
| surface roughness (Ra) (Å) | | | |
| landing zone | 20 | 23 | 18 |
| data zone | 7 | 2 | 8 |
| height of projections or depressions (Å) | 290 Å | 300 Å | 290 Å |

TABLE 3

(weight %)

| | Examples No. | | |
|---|---|---|---|
| | 4 | 5 | 6 |
| $SiO_2$ | 75.8 | 75.5 | 76.3 |
| $Li_2O$ | 10.0 | 11.0 | 10.2 |
| $P_2O_5$ | 2.5 | 2.7 | 2.5 |
| $ZrO_2$ | 1.5 | | 1.5 |
| $Al_2O_3$ | 2.5 | 3.5 | 2.0 |
| MgO | 2.0 | 2.6 | 2.0 |
| ZnO | 0.5 | 0.5 | 0.5 |
| $K_2O$ | 3.2 | 4.0 | 3.0 |
| $V_2O_5$ | 0.6 | | 0.6 |
| $MnO_2$ | 0.6 | | 0.6 |
| CuO | 0.6 | | 0.6 |
| $Cr_2O_3$ | | | |
| CoO | | | |
| $Sb_2O_3$ | 0.2 | 0.2 | 0.2 |
| $As_2O_3$ | | | |
| nucleation temperature (° C.) | 540 | 450 | 480 |
| crystallization temperature (° C.) | 700 | 690 | 700 |
| color | green | white | green |
| crystal phase and diameter | $Li_2Si_2O_5$ 0.1 μm | $Li_2Si_2O_5$ 0.2 μm | $Li_2Si_2O_5$ 0.1 μm α-quartz 0.1 μm |

TABLE 3-continued (weight %)

| | Examples No. | | |
|---|---|---|---|
| | 4 | 5 | 6 |
| crystal grain shape | $Li_2Si_2O_5$ globular | $Li_2Si_2O_5$ globular | $Li_2Si_2O_5$ globular α-quartz globular |
| percent transmission | | | |
| 1.06 μm T % | 55% | 88% | 53% |
| 10.5 μm T % | 0% | 0% | 0% |
| type of pulsed laser | YAG | $CO_2$ | YAG |
| surface roughness (Ra) (Å) | | | |
| landing zone | 22 | 17 | 21 |
| data zone | 4 | 3 | 5 |
| height of projections or depressions (Å) | 300 Å | 280 Å | 300 Å |

TABLE 4

(weight %)

| | Example No. 7 |
|---|---|
| $SiO_2$ | 76.0 |
| $Li_2O$ | 10.5 |
| $P_2O_5$ | 2.5 |
| $ZrO_2$ | 1.5 |
| $Al_2O_3$ | 2.8 |
| MgO | 1.0 |
| ZnO | 0.5 |
| $K_2O$ | 4.0 |
| $V_2O_5$ | 0.1 |
| $MnO_2$ | 0.1 |
| CuO | NiO0.8 |
| $Cr_2O_3$ | |
| CoO | |
| $Sb_2O_3$ | 0.2 |
| $As_2O_3$ | |
| nucleation temperature (° C.) | 520 |
| crystallization temperature (° C.) | 720 |
| color | dark brown |
| crystal phase and diameter | $Li_2Si_2O_5$ 0.1 μm α-quartz 0.3 μm |
| crystal grain shape | $Li_2Si_2O_5$ globular α-quartz globular |
| percent transmission | |
| 1.06 μm T % | 41% |
| 10.5 μm T % | 0% |
| type of pulsed laser | YAG |
| surface roughness (Ra) (Å) | |
| landing zone | 20 |
| data zone | 3 |
| height of projections or depressions (Å) | 280 Å |

Tables 5 to 8 show examples (No. 8 to No. 17) of compositions relating to the system which includes the NiO—CoO coloring agent system and two comparative examples of the prior art $Li_2$—$SiO_2$ system glass-ceramic (Japanese Patent Application Laid-open No. Sho 62-72547, Comparative Example 1 and Japanese Patent Application Laid-open No. Sho 63-210039, Comparative Example 2) together with the temperature of nucleation, temperature of crystallization, predominant crystal phase, diameter of crystal grains, shape of crystal grains, color appearance of the glass-ceramic, average percent transmission of laser wavelength 0.02 μm–0.6 μm and 1.05 μm–1.40 μm of the laser diode pumped solid-state laser at a plate thickness of 0.635 mm, surface roughness (Ra) of the data zone after polishing, type of the laser diode pumped solid-state laser used in the landing zone, wavelength used, and height and surface roughness (Ra) of projections or depressions formed by irradiation of laser beam.

TABLE 5

(weight %)

| | Examples No. | | |
|---|---|---|---|
| | 8 | 9 | 10 |
| $SiO_2$ | 75.7 | 75.7 | 75.5 |
| $Li_2O$ | 10.5 | 10.5 | 10.5 |
| $P_2O_5$ | 2.5 | 2.5 | 2.5 |
| $ZrO_2$ | 1.5 | 1.5 | 1.5 |
| $Al_2O_3$ | 2.5 | 2.5 | 2.5 |
| MgO | 1.6 | 1.2 | 1.0 |
| ZnO | 0.5 | 0.5 | 0.5 |
| $K_2O$ | 3.2 | 3.0 | 2.8 |
| NiO | 0.7 | 0.7 | 1.0 |
| CoO | 0.8 | 0.8 | 1.0 |
| $MnO_2$ | 0.1 | 0.1 | |
| $V_2O_5$ | 0.1 | 0.1 | |
| CuO | 0.1 | 0.1 | |
| $Cr_2O_3$ | | 0.6 | 1.0 |
| $Sb_2O_3$ | 0.2 | 0.2 | 0.2 |
| nucleation temperature (° C.) | 540 | 540 | 540 |
| crystallization temperature (° C.) | 720 | 730 | 710 |
| color | dark blue | dark blue | dark blue |
| crystal phase and diameter | $Li_2Si_2O_5$ 0.1 μm | $Li_2Si_2O_5$ 0.1 μm | $Li_2Si_2O_5$ 0.1 μm |
| crystal grain shape | $Li_2Si_2O_5$ globular | $Li_2Si_2O_5$ globular | $Li_2Si_2O_5$ globular |
| percent transmission 0.2 μm average value ~ 0.6 μm | 10.0 | 8.0 | 4.0 |
| 1.05 μm 0.635 mm t ~ 1.40 μm | 35.5 | 34.0 | 28.0 |
| type of laser | Nd: YAG | Nd: $YVO_4$ | Nd: YAG |
| laser wavelength | 0.532 μm | 0.532 μm | 1.064 μm |
| height of projections or depressions (Å) | 250 Å | 280 Å | 200 Å |
| surface roughness (Ra) of landing zone | 18 Å | 19 Å | 15 Å |
| surface roughness (Ra) of data zone | 3 Å | 4 Å | 3 Å |

TABLE 6

(weight %)

| | Examples No. | | |
|---|---|---|---|
| | 11 | 12 | 13 |
| $SiO_2$ | 76.5 | 76.0 | 75.0 |
| $Li_2O$ | 10.0 | 10.5 | 11.0 |
| $P_2O_5$ | 1.8 | 2.0 | 2.5 |
| $ZrO_2$ | 0.8 | 1.0 | 1.5 |
| $Al_2O_3$ | 2.5 | 2.5 | 2.5 |
| MgO | 0.6 | 0.5 | 2.5 |
| ZnO | 0.3 | 0.5 | 0.8 |
| $K_2O$ | 2.0 | 2.0 | 1.0 |
| NiO | 1.5 | 2.0 | 3.0 |
| CoO | 1.5 | 2.0 | 1.0 |
| $MnO_2$ | 0.4 | 0.2 | 1.0 |
| $V_2O_5$ | 0.4 | 0.3 | |
| CoO | 0.5 | 0.3 | 0.3 |
| $Cr_2O_3$ | 1.0 | | 0.1 |
| $Sb_2O_3$ | 0.2 | 0.2 | 0.2 |
| nucleation temperature (° C.) | 550 | 540 | 540 |
| crystallization temperature (° C.) | 750 | 740 | 750 |
| color | blue black | dark blue | dark blue |
| crystal phase and diameter | $Li_2Si_2O_5$ 0.1 μm α-cristobalite 0.1 μm | $Li_2Si_2O_5$ 0.1 μm α-quartz 0.2 μm | $Li_2Si_2O_5$ 0.1 μm α-quartz 0.3 μm |
| crystal grain shape | $Li_2Si_2O_5$ globular α-cristobalite globular | $Li_2Si_2O_5$ globular α-quartz globular | $Li_2Si_2O_5$ globular α-quartz globular |
| percent transmission 0.2 μm average value ≅ 0.6 μm | 5.0 | 7.0 | 6.0 |
| 1.05 μm 0.635 mm t ≅ 1.40 μm | 10.0 | 13.0 | 30.0 |
| type of laser | Nd: YAG | Nd: $YVO_4$ | Nd: YLF |
| laser wavelength | 1.064 μm | 1.064 μm | 1.047 μm |
| height of projections or depressions (Å) | 300 Å | 180 Å | 150 Å |
| surface roughness (Ra) of landing zone | 20 Å | 14 Å | 13 Å |
| surface roughness (Ra) of data zone | 5 Å | 7 Å | 9 Å |

TABLE 7

(weight %)

| | Examples No. | | |
|---|---|---|---|
| | 14 | 15 | 16 |
| $SiO_2$ | 75.7 | 76.0 | 75.5 |
| $Li_2O$ | 10.5 | 10.5 | 10.7 |
| $P_2O_5$ | 2.5 | 2.2 | 2.3 |
| $ZrO_2$ | 1.5 | 1.5 | 1.7 |
| $Al_2O_3$ | 2.5 | 2.3 | 2.2 |
| MgO | 1.6 | 1.5 | 1.6 |
| ZnO | 0.5 | 0.5 | 0.6 |
| $K_2O$ | 3.0 | 3.0 | 3.0 |
| NiO | 0.8 | 1.0 | 1.2 |
| CoO | 0.8 | 0.9 | 0.6 |
| $MnO_2$ | 0.1 | 0.1 | 0.05 |
| $V_2O_5$ | 0.1 | 0.1 | 0.05 |
| CuO | 0.2 | 0.2 | 0.3 |
| $Cr_2O_3$ | | | |
| $Sb_2O_3$ | 0.2 | 0.2 | 0.2 |
| nucleation temperature (° C.) | 530 | 500 | 480 |
| crystallizatlon temperature (° C.) | 710 | 730 | 720 |
| color | dark blue | dark blue | dark blue |
| crystal phase and diameter | $Li_2Si_2O_5$ 0.1 μm | $Li_2Si_2O_5$ 0.1 μm α-quartz 0.1 μm | $Li_2Si_2O_5$ 0.1 μm α-quartz 0.1 μm |

TABLE 7-continued (weight %)

| | Examples No. | | |
|---|---|---|---|
| | 14 | 15 | 16 |
| crystal grain shape | Li$_2$Si$_2$O$_5$ globular | Li$_2$Si$_2$O$_5$ globular α-quartz 0.1 μm | Li$_2$Si$_2$O$_5$ globular α-quartz 0.1 μm |
| percent transmission 0.2 μm | | | |
| average value ~ 0.6 μm 1.05 μm | 8.0 | 10.0 | 7.0 |
| 0.635 mm t ~ 1.40 μm | 32.0 | 36.0 | 31.0 |
| type of laser | Nd: YAG | Nd: YVO$_4$ | Nd: YVO$_4$ |
| laser wavelength | 1.064 μm | 0.532 μm | 1.064 μm |
| height of projections or depressions (Å) | 100 Å | 150 Å | 200 Å |
| surface roughness (Ra) of landing zone | 11 Å | 14 Å | 16 Å |
| surface roughness (Ra) of data zone | 3 Å | 4 Å | 3 Å |

TABLE 8

(weight %)

| | Examples No. | Comparative Examples | |
|---|---|---|---|
| | 17 | 1 | 2 |
| SiO$_2$ | 76.0 | 71.0 | 82.0 |
| Li$_2$O | 10.5 | 12.0 | 8.5 |
| P$_2$O$_5$ | 2.0 | 1.9 | 2.5 |
| ZrO$_2$ | 1.0 | | |
| Al$_2$O$_3$ | 2.0 | 9.6 | 3.1 |
| MgO | 1.0 | Na$_2$O | 1.5 |
| ZnO | 0.3 | 3.8 | |
| K$_2$O | 3.2 | CaO | |
| NiO | 1.5 | 0.4 | Na$_2$O 1.6 |
| CoO | 1.5 | SrO | |
| MnO$_2$ | 0.1 | 0.4 | |
| V$_2$O$_5$ | 0.2 | PbO | |
| CuO | 0.4 | 0.9 | |
| Cr$_2$O$_3$ | 0.1 | | |
| Sb$_2$O$_3$ | 0.2 | | |
| nucleation temperature (° C.) | 480 | 550 | 540 |
| crystallization temperature (° C.) | 730 | 780 | 800 |
| color | dark blue | white | white |
| crystal phase and diameter | Li$_2$Si$_2$O$_5$ 0.1 μm α-quartz 0.1 μm | Li$_2$Si$_2$O$_5$ 1.2 μm α-cristobalite 0.5 μm | Li$_2$Si$_2$O$_5$ 1.5 μm α-cristobalite 0.3 μm |
| crystal grain shape | Li$_2$Si$_2$O$_5$ globular α-quartz globular | Li$_2$Si$_2$O$_5$ acicular α-cristobalite globular | Li$_2$Si$_2$O$_5$ acicular α-cristobalite globular |
| percent transmission 0.2 μm | | | |
| average value ~ 0.6 μm 1.05 μm | 8.0 | 45.0 | 48.0 |
| 0.635 mm t ~ 1.40 μm | 20.0 | 87.0 | 86.0 |
| type of laser | Nd: YAG | | |
| laser wavelength | 1.064 μm | | |
| height of projections or depressions (Å) | 80 Å | | |

TABLE 8-continued (weight %)

| | Examples No. | Comparative Examples | |
|---|---|---|---|
| | 17 | 1 | 2 |
| surface roughness (Ra) of landing zone | 10 Å | | |
| surface roughness (Ra) of data zone | 6 Å | 14 Å | 12 Å |

For manufacturing the glass-ceramic substrates of the above described examples, materials including oxides, carbonates and nitrates are mixed and molten in a conventional melting apparatus at a temperature with the range from about 1350° C. to about 1450° C. The molten glass is stirred to homogenize it and thereafter formed into a disk shape and annealed to provide a formed glass. Then, this formed glass is subjected to heat treatment to produce the crystal nucleus under a temperature within the range from 450° C. to 550° C. for about one to twelve hours and then is subjected to further heat treatment for crystallization under a temperature within the range from 680° C. to 780° C. for about one to twelve hours to produce the desired glass-ceramic. Then, this glass-ceramic is lapped for about 10 to 20 minutes with lapping grains having average grain diameters ranging from 5 μm to 30 μm and then is finally polished for about 30 to 60 minutes with cerium oxide having average grain diamter ranging from 0.5 μm to 2 μm. Then, for forming of projections or depressions in the landing zone, the polished glass-ceramic substrate is subjected to the laser processing with a laser diode pumped solid-state laser or a CO$_2$ laser fixed in position and pulsed laser being irradiated while the glass-ceramic substrate is rotated.

The irradiation of pulsed laser is performed with the conditions such as laser wavelength, laser output, laser beam spot diameter, focus and laser pulse width etc. being controlled suitably in accordance with the specific composition of the glass-ceramic substrate.

As to Examples Nos. 1–7, the surface roughness (Ra) of the landing zone and the data zone is measured with the surface roughness measuring device Tencor P2 (Trademark).

As to Examples Nos. 8–17, the surface roughness (Ra) of the data zone as well as height and surface roughness (Ra) of projections or depressions in the landing zone are measured with the optical surace roughness analyser Zygo (Trademark).

Figure 6:
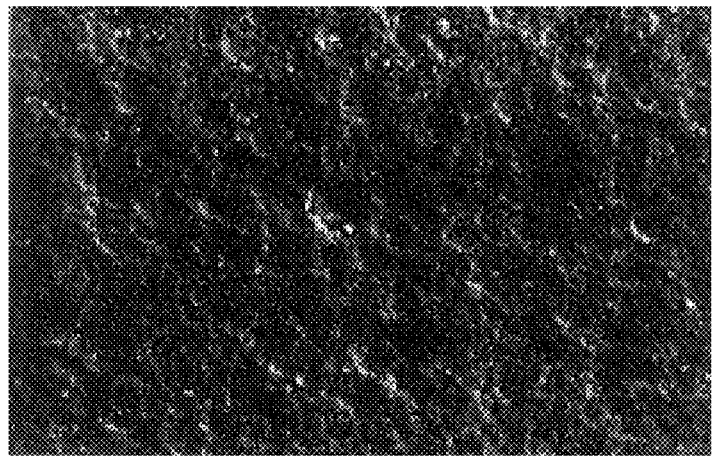
FIG. 6 shows an SEM (scanning electron microscope) image of the crystal structure of the glass-ceramic of Example 8 of the present invention after HF etching.
Figure 7:
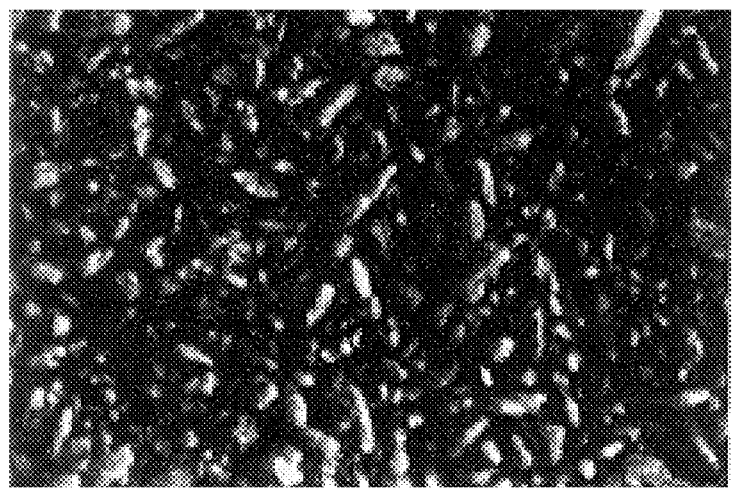
FIG. 7 shows an SEM image of the crystal structure of Comparative Example 2 of a prior art glass-ceramic after HF etching.

As shown in Tables 2 to 8 and FIGS. 6 and 7, the examples of the present invention and the comparative examples of the prior art Li$_2$O—SiO$_2$ system differ entirely from each other in the crystal grain diameter and the shape of the crystal grains of lithium disilicate (Li$_2$O.2SiO$_2$). In the glass-ceramic of the present invention, lithium disilicate, alpha-quartz and alpha-cristobalite have a globular crystal grain structure with a small grain diameter. In contrast, in the glass-ceramics of Comparative Examples 1 and 2, lithium disilicate has an acicular grain structure with a large grain diameter of 1.0 m or more. In a situation in which a more smooth surface is required, this crystal grain structure and grain diameter of the comparative examples adversely affect the surface roughness after polishing and produce defects due to coming off of the crystal grains from the substrate. Thus, it is difficult to obtain a surface characteristic having an excellent smoothness of surface roughness of 12 Å or less in the glass-ceramics of Comparative Examples 1 and 2.

Figure 8:
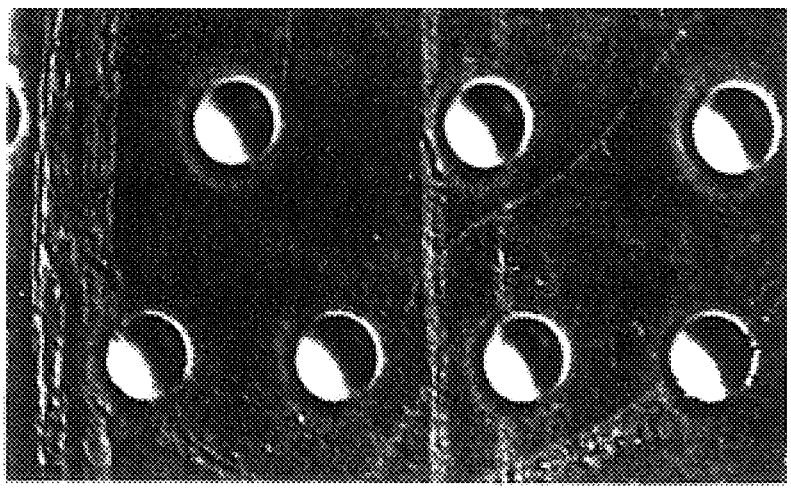
FIG. 8 is an SEM image of Example 10 after irradiation of laser beam by a laser diode pumped solid-state laser (Nd-YAG laser with laser wavelength of 1.064 μm)
Figure 9:
FIG. 9 is an SEM image of Example 3 after irradiation of laser beam by a $CO_2$ laser.
Figure 10:
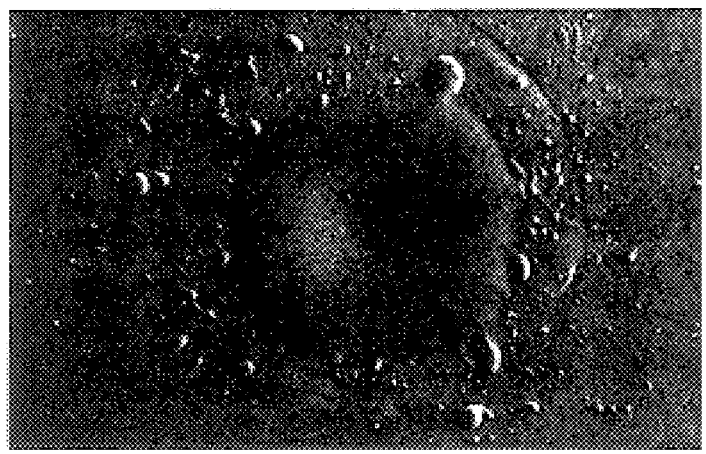
FIG. 10 is an SEM image of a prior art alumino-silicate tempered glass after irradiation of laser beam by a $CO_2$ laser.
Figure 11:
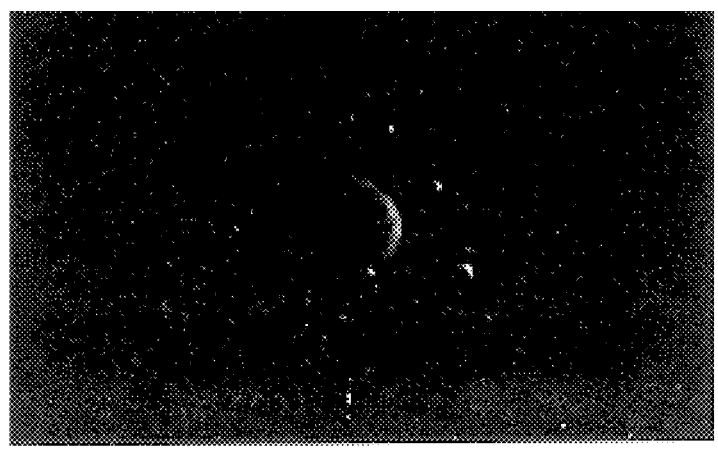
FIG. 11 is an SEM image of a prior art alumino-silicate tempered glass after irradiation of laser beam by a laser diode pumped solid-state laser (Nd-YAG laser with laser wavelength of 0.266 μm).

As regards the surface state shown in FIGS. 8 to 11, a laser processing resulting in forming of projections or derpessions having a uniform and desirable shape as shown in FIGS. 8 and 9 can be realized in the glass-ceramic substrate according to the invention in contrast to the above described defects produced in the prior art aluminum substrate and chemically tempered glass substrate. As will be apparent from FIGS. 10 and 11 showing the prior art chemically tempered glass ($SiO_2$—$Al_2O_3$—$Na_2O$, $K_2O$ ion exchange), the chemically tempered glass exhibits an instable and ununiform surface state after the processing by the laser diode pumped solid-state laser. In the chemically tempered glass shown in FIG. 11, sufficient heating was not achieved by laser irradiation at laser wavelength of 1.064 $\mu$m and 0.523 $\mu$m and the laser processing was made at wavelength of 0.266 $\mu$m. The result was an instable and ununiform surface state shown in FIG. 11.

It is considered that the glass-ceramic according to the invention is superior in resistance to heat to the chemically tempered glass which is in an amorphous state, has no strain change between the tempered surface layer and the untempered interior layer which is peculiar to the chemically tempered glass and has a crystal phase which can prevent growth of microcracks which are produced by various external actions and, as a total effect of these advantages, has an improved property of forming projections or depressions by irradiation of laser beam.

What is claimed is:

1. A method for manufacturing a glass-ceramic substrate for a magnetic information storage medium having a data zone and a landing zone comprising steps of:

melting a base glass and forming the molten glass into a desired shape;

subjecting the formed glass to heat treatment for producing a crystal nucleus;

further subjecting the formed glass to heat treatment for crystallization;

polishing the surface of the glass to a surface roughness (Ra) within a range from 3 Å to 9 Å; and forming in the landing zone a multiplicity of projections or depressions having a uniform shape by irradiation of laser beam, said projections or depressions having a height within a range of 50 Å to 300 Å and a surface roughness (Ra) within a range from 10 Å to 50 Å.

2. A method for manufacturing a glass-ceramic substrate for a magnetic information storage medium as defined in claim 1 wherein a laser used is a $CO_2$ laser.

3. A method for manufacturing a glass-ceramic substrate for a magnetic information storage medium as defined in claim 1 wherein a laser used is a laser diode pumped solid-state laser.

4. A method for manufacturing a glass-ceramic substrate for a magnetic information storage medium as defined in claim 3 wherein said laser diode pumped solid-state laser is an Nd-YAG laser, and Nd-$YVO_4$ laser or an ND-YLF laser.

5. A method for manufacturing a glass-ceramic substrate for a magnetic information storage medium as defined in claim 4 wherein wavelength of said laser diode pumped solid-state laser is within a range of 0.2 $\mu$m–0.6 $\mu$m or within a range of 1.05 $\mu$m–1.40 $\mu$m.

6. A method for manufacturing a glass-ceramic substrate for a magnetic information storage medium as defined in claim 1 wherein an interval of the projections or depressions is within a range from 10 $\mu$m to 200 $\mu$m.

7. A method for manufacturing a glass-ceramic substrate for a magnetic information storage medium having a data zone and a landing zone comprising steps of:

melting a base glass which consists essentially in weight percent of:

| | |
|---|---|
| $SiO_2$ | 70-80% |
| $Li_2O$ | 9-12% |
| $k_2O$ | 2-5% |
| MgO + ZnO | 1.2-5% |
| in which MgO | 0.5-5% |
| ZnO | 0.2-3% |
| $P_2O_5$ | 1.5-3% |
| $Al_2O_3$ | 2-5% |
| $Sb_2O_3$ | 0-1% |
| $As_2O_3$ | 0-1% | forming the molten glass into a desired shape;

subjecting the formed glass to heat treatment for producing a crystal nucleus under a temperature within a range from 450° C. to 550° C. for one to twelve hours;

further subjecting the glass to heat treatment for crystallization under a temperature within a range from 680° C. to 750° C. for one to twelve hours;

polishing the surface of the glass to a surface roughness (Ra) within a range from 3 Å to 9 Å; and forming in the landing zone a multiplicity of projections or depressions by irradiation of laser beam by a $CO_2$ laser, said projections or depressions having a height within a range of 50 Å to 300 Å and a surface roughness (Ra) within a range from 10 Å to 50 Å.

8. A method for manufacturing a glass-ceramic substrate for a magnetic information storage medium having a data zone and a landing zone comprising steps of:

melting a base glass which consists essentially in weight percent of:

| | |
|---|---|
| $SiO_2$ | 70-80% |
| $Li_2O$ | 9-12% |
| $K_2O$ | 2-5% |
| MgO + ZnO | 1.2-5% |
| in which MgO | 0.5-5% |
| ZnO | 0.2-3% |
| $P_2O_5$ | 1.5-3% |
| $Al_2O_3$ | 2-5% |
| $ZrO_2$ | 0.5-5% |
| $Sb_2O_3$ | 0-1% |
| $As_2O_3$ | 0-1% | forming the molten glass into a desired shape;

subjecting the formed glass to heat treatment for producing a crystal nucleus under a temperature within a range from 450° to 550° C. for one to twelve hours;

further subjecting the glass to heat treatment for crystallization under a temperature within a range from 680° C. to 750° C. for one to twelve hours;

polishing the surface of the glass to a surface roughness (Ra) within a range from 3 Å to 9 Å; and forming in the landing zone a multiplicity of projections or depressions by irradiation of laser beam by a $CO_2$ laser, said projections or depressions having a height within a range of 50 Å to 300 Å and a surface roughness (Ra) within a range from 10 Å to 50 Å.

9. A method for manufacturing a glass-ceramic substrate for a magnetic information storage medium having a data zone and a landing zone comprising steps of:

melting a base glass which consists essentially in weight percent of:

| | |
|---|---|
| $SiO_2$ | 70-80% |
| $Li_2O$ | 9-12% |
| $K_2O$ | 2-5% |
| MgO + ZnO | 1.2-5% |
| in which MgO | 0.5-5% |
| ZnO | 0.2-3% |
| $P_2O_5$ | 1.5-3% |
| $Al_2O_3$ | 2-5% |
| $Sb_2O_3$ | 0-1% |
| $As_2O_3$ | 0-1% |
| $V_2O_5$ + CuO + $Cr_2O_3$ + $MnO_2$ + CoO + NiO | 0.08-2.5% |
| in which $V_2O_5$ | 0.02-0.8% |
| CuO | 0.02-0.8% |
| $Cr_2O_3$ | 0-0.8% |
| $MnO_2$ | 0.02-0.8% |
| CoO | 0-0.8% |
| NiO | 0-0.8% | forming the molten glass into a desired shape;

subjecting the formed glass to heat treatment for producing a crystal nucleus under a temperature within a range from 450° C. to 550° C. for one to twelve hours;

further subjecting the glass to heat treatment for crystallization under a temperature within a range from 680° C. to 750° C. for one to twelve hours;

polishing the surface of the glass to a surface roughness (Ra) within a range from 3 Å to 9 Å; and forming in the landing zone a multiplicity of projections or depressions by irradiation of laser beam by a laser diode pumped solid-state laser, said projections or depressions having a height within a range of 50 Å to 300 Å and a surface roughness (Ra) within a range from 10 Å to 50 Å.

10. A method for manufacturing a glass-ceramic substrate for a magnetic information storage medium having a data zone and a landing zone comprising steps of:

melting a base glass which consists essentially in weight percent of:

| | |
|---|---|
| $SiO_2$ | 70-80% |
| $Li_2O$ | 9-12% |
| $K_2O$ | 2-5% |
| MgO + ZnO | 1.2-5% |
| in which MgO | 0.5-5% |
| ZnO | 0.2-3% |
| $P_2O_5$ | 1.5-3% |
| $Al_2O_3$ | 2-5% |
| $ZrO_2$ | 0.5-5% |
| $Sb_2O_3$ | 0-1% |
| $As_2O_3$ | 0-1% |
| $V_2O_5$ + CuO + $Cr_2O_3$ + $MnO_2$ + CoO + NiO | 0.08-2.5% |
| in which $V_2O_5$ | 0.02-0.8% |
| CuO | 0.02-0.8% |
| $Cr_2O_3$ | 0-0.8% |
| $MnO_2$ | 0.02-0.8% |
| CoO | 0-0.8% |
| NiO | 0-0.8% | forming the molten glass into a desired shape;

subjecting the formed glass to heat treatment for producing a crystal nucleus under a temperature within a range from 450° C. to 550° C. for one to twelve hours;

further subjecting the glass to heat treatment for crystallization under a temperature within a range from 680° C. to 780° C. for one to twelve hours;

polishing the surface of the glass to a surface roughness (Ra) within a range from 3 Å to 9 Å; and forming in the landing zone a multiplicity of projections or depressions by irradiation of laser beam by a laser diode pumped solid-state laser, said projections or depressions having a height within a range of 50 Å to 300 Å and a surface roughness (Ra) within a range from 10 Å to 50 Å.

11. A method for manufacturing a glass-ceramic substrate for a magnetic information storage medium having a data zone and a landing zone comprising steps of:

melting a base glass which consists essentially in weight percent of:

| | |
|---|---|
| $SiO_2$ | 70-80% |
| $Li_2O$ | 9-12% |
| $K_2O$ | 2-5% |
| MgO + ZnO | 1.2-5% |
| in which MgO | 0.5-5% |
| ZnO | 0.2-3% |
| $P_2O_5$ | 1.5-3% |
| $ZrO_2$ | 0.5-5% |
| $Al_2O_3$ | 2-5% |
| $Sb_2O_3$ | 0-1% |
| $As_2O_3$ | 0-1% |
| NiO | 0.5-3% |
| CoO | 0.5-3% |
| $MnO_2$ | 0-0.5% |
| $V_2O_5$ | 0-0.5% |
| CuO | 0-1% |
| $Cr_2O_5$ | 0-1.5% | forming the molten glass into a desired shape;

subjecting the formed glass to heat treatment for producing a crystal nucleus under a temperature within a range from 450° C. to 550° C. for one to twelve hours;

further subjecting the glass to heat treatment for crystallization under a temperature within a range from 680° C. to 750° C. for one to twelve hours;

polishing the surface of the glass to a surface roughness (Ra) within a range from 3 Å to 9 Å; and forming in the landing zone a multiplicity of projections or depressions by irradiation of laser beam by a laser diode pumped solid-state laser, said projections or depressions having a height within a range of 50 Å to 300 Å and a surface roughness (Ra) within a range from 10 Å to 50 Å.

* * * * *